(12) United States Patent
Bacic et al.

(10) Patent No.: US 9,506,401 B2
(45) Date of Patent: Nov. 29, 2016

(54) METHOD OF DETECTING SHAFT BREAK

(75) Inventors: Marko Bacic, Oxford (GB); Stephen Granville Garner, Ashby-de-la-Zouch (GB)

(73) Assignee: ROLLS-ROYCE plc, London (GB)

( * ) Notice: Subject to any disclaimer, the term of this patent is extended or adjusted under 35 U.S.C. 154(b) by 537 days.

(21) Appl. No.: 13/984,639

(22) PCT Filed: Feb. 24, 2012

(86) PCT No.: PCT/EP2012/053137
§ 371 (c)(1),
(2), (4) Date: Aug. 9, 2013

(87) PCT Pub. No.: WO2012/119865
PCT Pub. Date: Sep. 13, 2012

(65) Prior Publication Data
US 2013/0312423 A1    Nov. 28, 2013

(30) Foreign Application Priority Data

Mar. 9, 2011   (GB) .................................. 1103989.8
Jun. 16, 2011  (GB) .................................. 1110141.7

(51) Int. Cl.
*F02C 7/00*     (2006.01)
*F01D 21/00*    (2006.01)
(Continued)

(52) U.S. Cl.
CPC ............... *F02C 7/00* (2013.01); *F01D 21/003* (2013.01); *F01D 21/045* (2013.01); *F01D 21/06* (2013.01); *G01H 1/006* (2013.01); *G01M 13/02* (2013.01); *G01M 15/046* (2013.01); *G01M 15/14* (2013.01); *F05D 2270/021* (2013.01);
(Continued)

(58) Field of Classification Search
CPC .................... F05D 2260/80; F05D 2270/021; F05D 2270/022; F05D 2270/09; F05D 2270/304; F05D 2270/335; F01D 21/003; F01D 21/02; F01D 21/045; F01D 21/06; G01H 1/00; G01H 1/006; G01H 1/10
See application file for complete search history.

(56) References Cited

U.S. PATENT DOCUMENTS 5,258,923 A   11/1993  Imam et al.
5,479,824 A    1/1996  Torres
(Continued)

FOREIGN PATENT DOCUMENTS

FR   2 921 974 A1   4/2009
JP   2007-108189    4/2007
(Continued)

OTHER PUBLICATIONS

Search Report issued in British Application No. 1103989.8 dated Mar. 29, 2011.
(Continued)

*Primary Examiner* — Arun Goyal
(74) *Attorney, Agent, or Firm* — Oliff PLC

(57) ABSTRACT

A method of detecting shaft break in a gas turbine engine having a shaft system. The shaft system including a shaft that couples a compressor and a turbine. First construct a frequency model of the shaft system. Then determine a notch frequency and a first torsional frequency for the shaft system from the model. Then in real time measure a rotational speed of the shaft; detect the presence or absence of a feature at least one of the notch frequency and the first torsional frequency in the measured speed; and generate a shaft break signal in response to the absence of at least one of the features.

19 Claims, 3 Drawing Sheets

(51) Int. Cl.
*F01D 21/04* (2006.01)
*F01D 21/06* (2006.01)
*G01M 13/02* (2006.01)
*G01M 15/04* (2006.01)
*G01M 15/14* (2006.01)
*G01H 1/00* (2006.01)

(52) U.S. Cl.
CPC ..... *F05D2270/09* (2013.01); *F05D 2270/091* (2013.01); *F05D 2270/304* (2013.01); *F05D 2270/335* (2013.01)

(56) References Cited

U.S. PATENT DOCUMENTS

| | | | |
|---|---|---|---|
| 6,321,525 B1 | 11/2001 | Rogers | |
| 6,494,046 B1* | 12/2002 | Hayess | F01D 21/00 60/39.091 |
| 6,711,952 B2* | 3/2004 | Leamy | F01D 21/00 73/579 |
| 8,380,447 B2* | 2/2013 | Bechhoefer | G01H 1/00 702/34 |
| 2008/0083280 A1 | 4/2008 | Filbry | |
| 2012/0148382 A1* | 6/2012 | Kruger | F02C 9/00 415/1 |

FOREIGN PATENT DOCUMENTS

| | | |
|---|---|---|
| JP | 2007-132767 | 5/2007 |
| JP | 2009-68950 | 4/2009 |
| WO | WO 92/05437 A1 | 4/1992 |
| WO | WO 99/64727 A1 | 12/1999 |

OTHER PUBLICATIONS

Search Report issued in British Application No. 1110141.7 dated Aug. 30, 2011.
International Search Report issued in International Patent Application No. PCT/EP2012/053137 dated Aug. 28, 2012.
Written Opinion issued in International Patent Application No. PCT/EP2012/053137 dated Aug. 28, 2012.

* cited by examiner

METHOD OF DETECTING SHAFT BREAK

The present invention relates to a method of detecting shaft break. It is particularly, although not exclusively, related to detecting break of a shaft of a gas turbine engine.

It is an object of the present invention to provide a more accurate and more timely method of detecting shaft break.

Accordingly the present invention provides a method of detecting shaft break in a gas turbine engine having a shaft system, the shaft system comprising a shaft that couples a compressor and a turbine; the method comprises steps to: a) construct a frequency model of the shaft system; b) determine a notch frequency and a first torsional frequency for the shaft system from the model; c) measure a rotational speed of the shaft; d) detect the presence or absence of a feature at least one of the notch frequency and the first torsional frequency in the measured speed; and e) generate a shaft break signal in response to the absence of at least one of the features.

Advantageously the absence of a feature at the notch frequency and/or the first torsional frequency provides an accurate indication of a shaft break event and reduces the possibility of falsely declaring a shaft break when none has occurred.

The frequency model may be constructed and the notch and first torsional frequencies identified (steps a and b) before using the gas turbine engine. The subsequent steps may be performed in real time. Advantageously this improves the timeliness of the method of the present invention.

The feature may comprise a notch at the notch frequency and a peak at the first torsional frequency. A notch is a local minimum magnitude and a peak is a local maximum.

The shaft break signal may be generated in response to the absence of a feature at both the notch frequency and the first torsional frequency. By requiring absence of both features there is additional reliability in the method.

The rotational speed of the shaft may be measured close to the compressor. In this case the notch frequency is proportional to the square root of the shaft stiffness divided by the turbine inertia. Alternatively the rotational speed of the shaft may be measured close to the turbine. In this case the notch frequency is proportional to the square root of the shaft stiffness divided by the compressor inertia. In either case the first torsional frequency is proportional to the square root of the shaft stiffness multiplied by the sum of the compressor and turbine inertias and divided by their product.

The method may comprise an additional step before step d) to apply a filter to the measured speed. The filter may be arranged to amplify frequencies close to the notch frequencies. The absence of a feature at the notch frequency is indicated by a peak having magnitude greater than a threshold at a frequency close to the notch frequency. Alternatively the filter may be arranged to cancel frequencies close to the first torsional frequency. The absence of a feature at the first torsional frequency is indicated by a notch having magnitude less than a threshold at a frequency close to the first torsional frequency.

The filter may be a model-based filter, preferably a Kalman filter. The model is a matrix model of a third order mechanical system.

The method may further comprise subsequent processing of the filtered measured speed after the filtering. The subsequent processing may comprise summing the squares of the last n filtered measured speed measurements or integrating those measurements up to a threshold. The threshold may be a function of an engine power indicator such as compressor exit pressure or corrected shaft speed, or altitude. The indicator may be lagged. The number of measurements n may be 2 to 50 or more and is governed by processing power and desired accuracy.

The present invention also provides a gas turbine engine control system comprising the method as described and a gas turbine engine comprising the gas turbine engine control system.

The present invention will be more fully described by way of example with reference to the accompanying drawings, in which.

Figure 1:
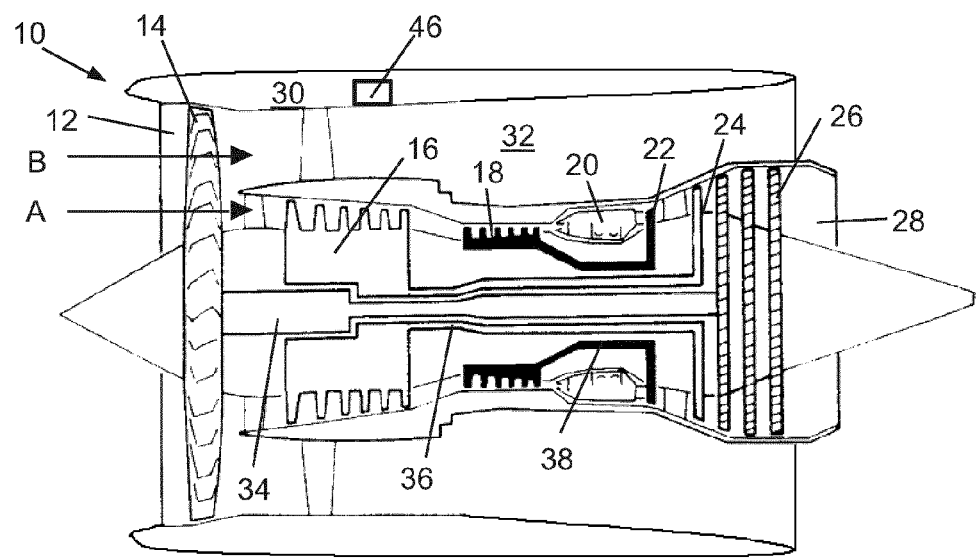
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an array of inlet guide vanes 40, an intermediate pressure compressor 16, a high pressure compressor 18, a combustor 20, a high pressure turbine 22, an intermediate pressure turbine 24, a low pressure turbine 26 and an exhaust nozzle 28. The fan 14 is coupled to the low pressure turbine 26 by a low pressure shaft 34. The intermediate pressure compressor 16 is coupled to the intermediate pressure turbine 24 by an intermediate pressure shaft 36. The high pressure compressor 18 is coupled to the high pressure turbine 22 by a high pressure shaft 38.

A nacelle 30 surrounds the gas turbine engine 10 and defines, in axial flow B, a bypass duct 32. A control system 46, such as an electronic engine controller (EEC), is provided on the engine 10 and is configured to control aspects of the operation of the engine 10.

In rare circumstances one of the shafts 34, 36, 38 may break. When this occurs the fan 14 or compressor 16, 18 decelerates rapidly because it is no longer driven. However, the turbine 22, 24, 26 rapidly accelerates because the load on it is substantially reduced. This in turn may cause the turbine disc to burst releasing high energy debris and resulting in catastrophic failure of the engine 10. Where the engine 10 is used to power an aircraft the released high energy debris may not be captured and there is thus a risk of some debris impacting or piercing the fuselage of the aircraft. Therefore there is a need to identify shaft breakages and to shut down the engine 10 quickly by shutting off the fuel supply. Typically a shaft break event must be controlled in less than 1 second or the release of high energy debris cannot be reliably prevented.

Figure 2:
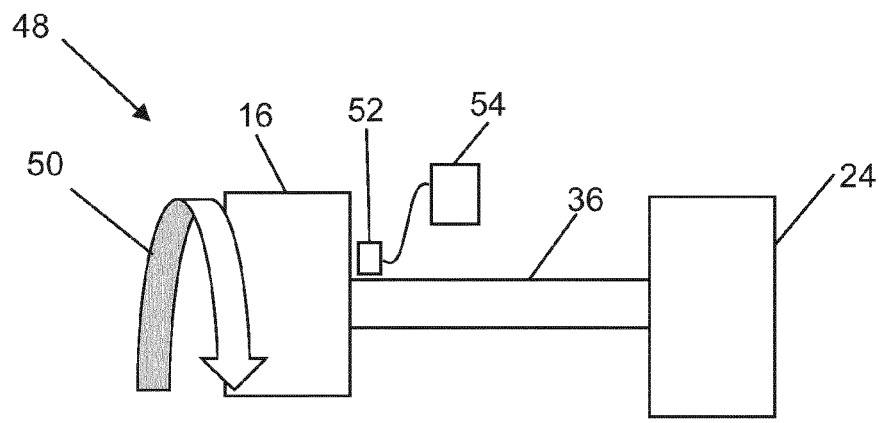
FIG. 2 and FIG. 3 are a schematic illustration of a shaft system in unbroken and broken configurations.

A simplistic illustration of a shaft system 48, for example the intermediate pressure shaft system, is shown in FIG. 2. The shaft system 48 comprises the intermediate pressure shaft 36 coupled between the intermediate pressure compressor 16 and the intermediate pressure turbine 24. The shaft system 48 rotates as a whole as indicated by arrow 50. A measuring device 52 is arranged to measure the rotational speed of the intermediate pressure shaft 34 and is coupled to a processor 54. The measuring device 52 is preferably a speed probe located close to the intermediate pressure compressor 16. The measuring device 52 may measure the rotational speed substantially continuously or may sample the rotational speed at defined intervals. This interval may be in the range 1 ms to 30 ms. Preferably samples are taken every 3 ms to 5 ms. The processor 54 receives the measured rotational speed from the measuring device 52 and processes it to provide a frequency response.

The intermediate pressure compressor 16 has a mass $m_{IPC}$ and inertia $I_{IPC}$ whilst the intermediate pressure turbine 24 has mass $m_{IPT}$ and inertia $I_{IPT}$. The intermediate pressure shaft 36 has stiffness $k_{IP}$. The masses, inertias and stiffness are known properties of the shaft system 48.

Figure 3:
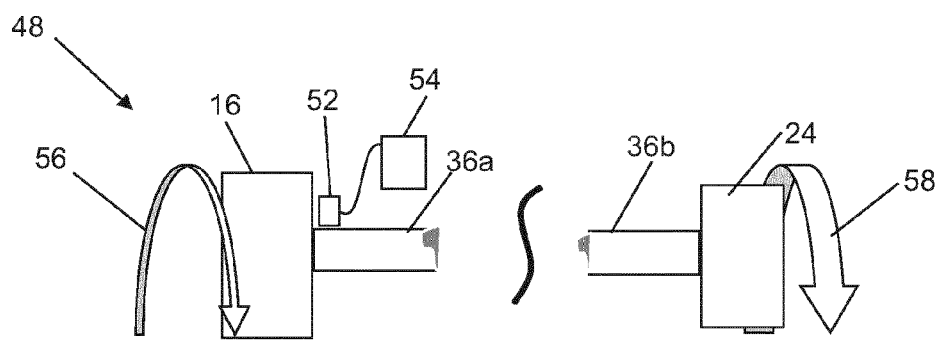

FIG. 3 shows the intermediate pressure shaft system 48 when the intermediate pressure shaft 36 has broken in a shaft break event. Thus the intermediate pressure shaft 36 comprises a first portion 36a that remains coupled to the intermediate pressure compressor 16 and a second portion 36b that remains coupled to the intermediate pressure turbine 24. Although drawn approximately equal in length, it will be apparent to the skilled reader that the first portion 36a and second portion 36b of the intermediate pressure shaft 36 may be different lengths depending on where the break occurs and the cause of the break. Equally the break may not be a clean break but may leave jagged ends to the first and second portions 36a, 36b.

In normal operation the turbine 24 drives the compressor 16 at a rotational speed resulting in the rotation 50 shown in FIG. 2. In the event of a shaft break the turbine 24 no longer drives the compressor 16 which therefore continues to rotate in the same direction but decelerates rapidly as indicated by arrow 56. Meanwhile the turbine 24 accelerates because it no longer experiences such a large load as indicated by arrow 58.

Figure 4:
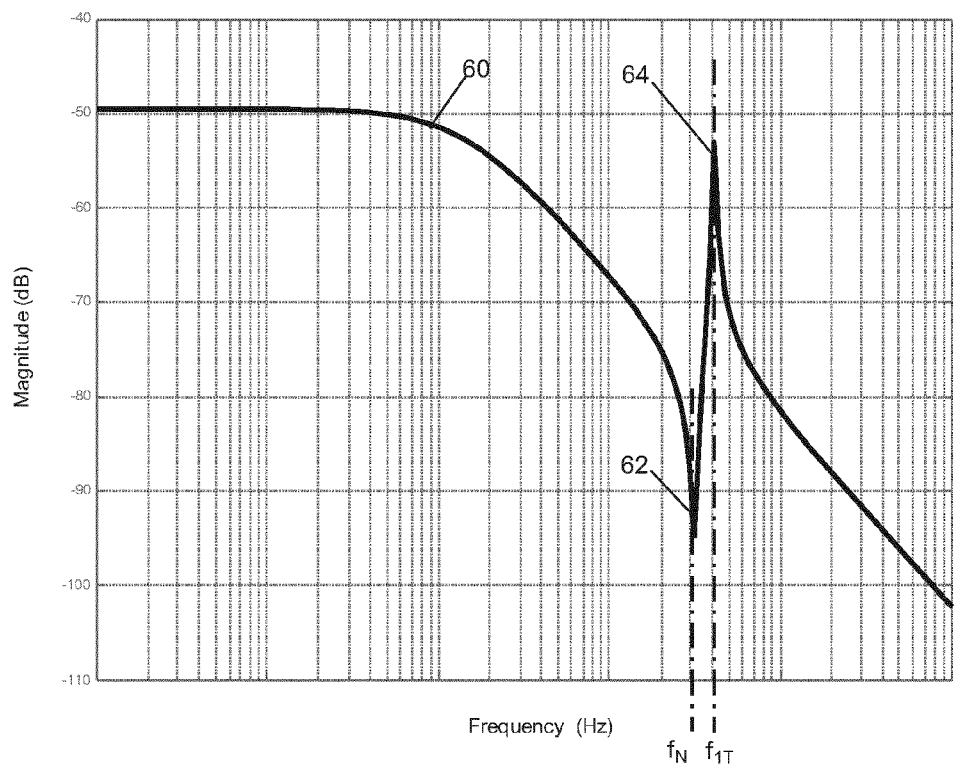
FIG. 4 and FIG. 5 are graphs of a frequency response of the shaft system in unbroken and broken configurations.

In normal operation the intermediate pressure shaft system 48 behaves as a third order mechanical system modelled as a matrix model of the form $$\begin{pmatrix} \omega_{IPC} \\ \omega_{IPT} \end{pmatrix} = \begin{pmatrix} FR_1 & FR_2 \\ FR_3 & FR_4 \end{pmatrix} \begin{pmatrix} \tau_{IPC} \\ \tau_{IPT} \end{pmatrix},$$

where $\omega$ is the rotational speed and T is the torque of the compressor 16 or turbine 24. $FR_1$ to $FR_4$ are frequency responses. FIG. 4 shows an example of $FR_1$ as frequency response 60 for the intermediate pressure shaft system 48 in the unbroken configuration. The frequency response 60 is plotted as logarithmic frequency in Hertz against magnitude in decibels, which is the transfer function of compressor speed divided by compressor torque. At low frequencies the frequency response 60 exhibits a steady magnitude of approximately −50 dB. From approximately 0.5 Hz the magnitude of the frequency response 60 decreases at an increasing rate until it reaches a first feature, notch 62 at a notch frequency $f_N$. The notch frequency $f_N$ is calculated from $$f_N = \frac{1}{2\pi}\sqrt{\frac{k_{IP}}{I_{IPT}}}.$$

At the notch 62 the magnitude is a local minimum of approximately −95 dB.

The frequency response 60 exhibits a large increase in magnitude over a short frequency range until it forms a second feature peak 64 at the first torsional frequency $f_{1T}$ of the shaft system 48. The first torsional frequency $f_{1T}$ is calculated from $$f_{1T} = \frac{1}{2\pi}\sqrt{\frac{k_{IP}\cdot(I_{IPC}+I_{IPT})}{I_{IPC}\times I_{IPT}}}.$$

At high frequencies than the first torsional frequency $f_{1T}$ the magnitude of the frequency response 60 decreases rapidly and then slows to an approximately linear decrease on the logarithmic scale at a rate of 20 dB per decade.

Figure 5:
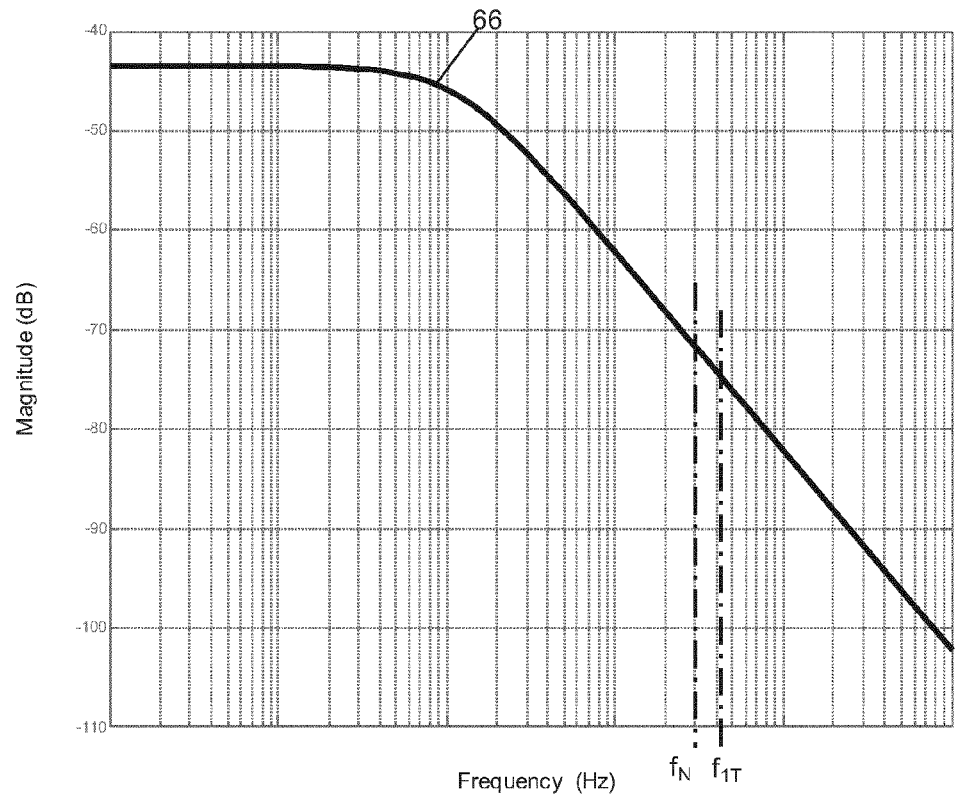

FIG. 5 is an equivalent graph to FIG. 4 that illustrates a frequency response 66 for the shaft system 48 having a broken shaft 36. At low frequencies the magnitude of the frequency response 66 is greater than for the unbroken shaft system 48; approximately −43 dB. The magnitude of the frequency response 66 starts to decrease from around 0.5 Hz and then decreases in a substantially linear relationship on the logarithmic scale for frequencies above approximately 2 Hz. As is apparent from FIG. 5, there is no notch 62 at the notch frequency $f_N$ and no peak 64 at the first torsional frequency $f_{1T}$.

The absence of features at either or both of these frequencies is thus a reliable indication that the shaft system 48 has incurred a shaft break event. The method of the present invention then generates a shaft break signal in response to the absence of features at either or both of the notch frequency $f_N$ and the first torsional frequency $f_{1T}$. The shaft break signal is used to trigger a command to shut down the gas turbine engine 10, for example by ordering a fuel shut off valve to close or a fuel metering valve to slew shut. Engine shut down in consequence of shaft break detection aims to prevent release of high energy debris from the engine 10 due to burst components. Alternatively the absence of features at both the notch frequency $f_N$ and the first torsional frequency $f_{1T}$ may be necessary to generate the shaft break signal to reduce the incidence of false positive signals that result in engine shut down. In one embodiment of the method of the present invention the absence of a feature at each of the notch frequency $f_N$ and the first torsional frequency $f_{1T}$ may be determined separately to further decrease the probability of false detection of shaft break events.

It may also be possible to detect the larger magnitude at low frequencies of the frequency response 66 for the broken shaft system 48 relative to the magnitude of the frequency response 60 for the unbroken shaft system 48. However, the difference in magnitude may not be sufficiently large to be distinguishable from noise on the signals. Preferably this indication may be used in addition to the absence of a feature at least one of the notch frequency $f_N$ and the first torsional frequency $f_{1T}$.

A preferred method of detecting the presence or absence of the notch 62 or peak 64 is to apply a filter to the frequency response. In order to detect the notch 62, a filter that amplifies a small range of frequencies around the notch frequency $f_N$ is required. It will be apparent to the skilled reader that it is inadvisable to amplify only the notch frequency $f_N$ because changes to the unbroken mechanical shaft system 48, such as damage to or accretion of material on the compressor 16 or turbine 24, may result in the notch 62 moving to a slightly different frequency to the notch frequency $f_N$. By amplifying frequencies around the notch frequency $f_N$ the filtered frequency response will exhibit no notch or peak when the shaft system 48 is unbroken. However, when the shaft 36 is broken the amplifying filter will act on a frequency with a larger magnitude and the filtered frequency response will therefore exhibit a peak at or close to the notch frequency $f_N$. A threshold magnitude can be predetermined and the peak generated by the filter compared to the threshold. The threshold can be set so that the filtered frequency response does not cross the threshold in any engine condition, including surge, except for a shaft break event. The threshold may be a function of an engine power indicator such as compressor exit pressure or corrected shaft speed, or altitude. The indicator may be lagged. Thus a filtered frequency response feature having magnitude greater than the threshold will indicate a shaft break and the method of the present invention will therefore generate a shaft break signal.

Similarly, the filter can be arranged to cancel a small range of frequencies around the first torsional frequency $f_{1T}$ in order to detect the peak 62. To cancel the frequencies an equivalent magnitude frequency is subtracted from the frequency response at the range of frequencies identified. As with the notch 62, the filtered frequency response therefore exhibits neither a peak nor a notch at the first torsional frequency $f_{1T}$ under any normal operating conditions of the gas turbine engine 10 including surge. However, in the event of a shaft break event the frequency response 66 around the first torsional frequency $f_{1T}$ has much smaller magnitude than for the unbroken shaft system 48 and so the filtered frequency response exhibits a notch. A threshold can be applied in this case also so that if the magnitude of the filtered frequency response at around the first torsional frequency $f_{1T}$ is less than the threshold, the shaft break signal is generated. This threshold may also be a function of an engine power indicator such as compressor exit pressure or corrected shaft speed, or altitude. The indicator may be lagged.

Figure 6:
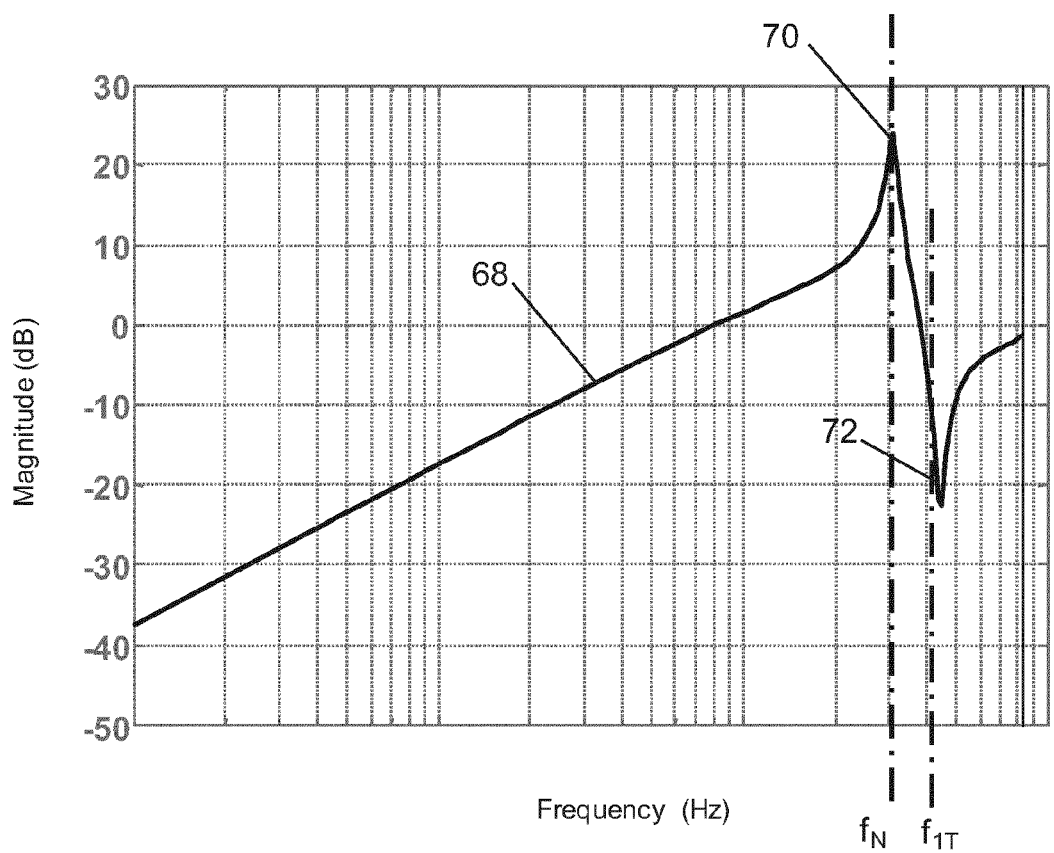
FIG. 6 is a graph of a frequency response for a filter.

An exemplary frequency response 68 for such a filter is shown in FIG. 6. There is a peak 70 at the notch frequency $f_N$ and a notch 72 at the first torsional frequency $f_{1T}$. Although the peak 70 and notch 72 are shown as pointed at their apexes they may also be flattened to amplify or cancel a larger range of frequencies.

The filter may be a Kalman filter, another model-based filter, a band pass filter or any other suitable filter as known in the art. The Kalman or other model-based filter is based on the full matrix model of the third order system but only one frequency response is analysed. Other methods of analysing the frequency response obtained from converting the measured rotational speed of the shaft system 48 to determine the presence or absence of at least one of the notch 62 and peak 64 may be substituted with equal felicity. For example, wavelet analysis could be used instead of a filter.

Advantageously the measured speed may be subtracted from the filtered speed and the result squared to give the error. The variance of n samples is the sum of the errors and a moving average may be calculated therefrom. This moving average may then be compared to the threshold to determine when the shaft break signal is generated. This is equivalent to multiplying the frequency spectrum of the measured speed signal by the filtered frequency response 68 and computing the signal power.

The method of the present invention thus provides a method of detecting shaft break in a shaft system 48 of a gas turbine engine 10 by modelling the shaft system 48 in the frequency domain and identifying key frequencies having features during normal operation of the gas turbine engine 10, measuring the shaft system 48 during operation and converting the measurements to the frequency domain, and then detecting the absence of features at the key frequencies to trigger generation of the shaft break signal. The processing of the frequencies is performed by the processor 54. Preferably the method of the present invention is implemented in a control system that performs the functions attributed to the processor 54, more preferably in the gas turbine engine control system 46. This enables the control system 46 to immediately act upon the shaft break signal to command engine shut down so that it happens as quickly as possible after positive detection of a shaft break event.

Although the measuring device 52 is preferably a speed probe located near to the intermediate pressure compressor 16 it may instead be a speed probe located close to the intermediate pressure turbine 24. In this case the notch frequency $f_N$ would be calculated from $$f_N = \frac{1}{2\pi}\sqrt{\frac{k_{IP}}{I_{IPC}}}$$

and the first torsional frequency $f_{1T}$ would be unchanged. Thus the frequency response produced is an example of $FR_4$. A speed probe 52 located near to the turbine 24 must be able to operate in a much harsher environment than a speed probe 52 located near to the compressor 16. Beneficially this arrangement could be used as a confirmatory indication of a shaft break event with the primary indication being a measured increase of turbine speed greater than a predetermined threshold.

Although the method of the present invention has been described with respect to the intermediate pressure shaft system 48, it is equally applicable to the high pressure shaft system comprising the high pressure compressor 18, the high pressure shaft 38 and the high pressure turbine 22 or to the low pressure shaft system comprising the fan 14, low pressure shaft 34 and the low pressure turbine 26.

The present invention has been envisaged for use in a gas turbine engine 10 for propelling an aircraft since the effects of shaft breakage are potentially catastrophic. However, the present invention also has utility for other types of gas turbine engine 10 including for marine applications and for industrial applications such as gas and oil pumping engines.

The invention claimed is:

1. A method of detecting shaft break in a gas turbine engine having a shaft system, the shaft system comprising a shaft that couples a compressor and a turbine; the method comprising:
    constructing a frequency response model of the shaft system; determining a notch frequency and a first torsional frequency for the shaft system from the frequency response model;
    measuring a rotational speed of the shaft;
    detecting whether a feature exists at least at one of the notch frequency and the first torsional frequency in the rotational speed; and
    generating a shaft break signal in response to an absence of the feature at least at one of the notch frequency and the first torsional frequency, the shaft break signal indicating that the turbine no longer drives the compressor,
    wherein the feature comprises a first feature at the notch frequency comprising a notch and a second feature at the first torsional frequency comprising a peak.

2. The method as claimed in claim 1, wherein the shaft break signal is generated in response to the absence of both the first feature at the notch frequency and the second feature at the first torsional frequency.

3. The method as claimed in claim 1, wherein the rotational speed of the shaft is measured close to the compressor.

4. The method as claimed in claim 3, wherein the notch frequency is proportional to square root of a shaft stiffness divided by a turbine inertia.

5. The method as claimed in claim 1, wherein the rotational speed of the shaft is measured close to the turbine.

6. The method as claimed in claim 5, wherein the notch frequency is proportional to square root of a shaft stiffness divided by a compressor inertia.

7. The method as claimed in claim 1, wherein the first torsional frequency is proportional to square root of a shaft stiffness multiplied by a sum of a compressor inertia and a turbine inertia and divided by a product of the compressor inertia and the turbine inertia.

8. The method as claimed in claim 1, further comprising applying a filter to the rotational speed before the detecting step.

9. The method as claimed in claim 8, wherein the filter is arranged to amplify frequencies close to the notch frequency.

10. The method as claimed in claim 9, wherein the absence of the first feature at the notch frequency is indicated by a peak having a magnitude greater than a threshold at a frequency close to the notch frequency.

11. The method as claimed in claim 8, wherein the filter is arranged to cancel frequencies close to the first torsional frequency.

12. The method as claimed in claim 11, wherein the absence of the second feature at the first torsional frequency is indicated by a notch having a magnitude less than a threshold at a frequency close to the first torsional frequency.

13. The method as claimed in claim 8, wherein the filter is a model-based filter.

14. The method as claimed in claim 13, wherein the model-based filter is a Kalman filter.

15. The method as claimed in claim 8, further comprising subsequently processing the filtered rotational speed.

16. The method as claimed in claim 15, wherein the subsequent processing comprises summing squares of last n filtered measurements of the rotational speed.

17. The method as claimed in claim 15, wherein the subsequent processing comprises integrating between last n filtered measurements of the rotational speed and a threshold.

18. A gas turbine engine control system comprising a processor configured to carry out the method according to claim 1.

19. A gas turbine engine comprising the gas turbine engine control system according to claim 18.

* * * * *